US007593990B2

(12) United States Patent
Himmel et al.

(10) Patent No.: US 7,593,990 B2
(45) Date of Patent: Sep. 22, 2009

(54) AUTOMATICALLY SENDING A URL BY E-MAIL OR TELEPHONE

(75) Inventors: Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1695 days.

(21) Appl. No.: 10/047,004

(22) Filed: Jan. 16, 2002

(65) Prior Publication Data

US 2003/0135562 A1 Jul. 17, 2003

(51) Int. Cl.
*G06F 15/16* (2006.01)
(52) U.S. Cl. .................. 709/206; 455/415; 379/93.23
(58) Field of Classification Search ................. 709/206, 709/217, 218; 379/88.17, 265.01–265.14, 379/93.23, 142.06, 142.15, 142.01, 142.17; 455/415; 340/7.53, 7.51

See application file for complete search history.

(56) References Cited

U.S. PATENT DOCUMENTS

| 5,724,412 | A | * | 3/1998 | Srinivasan | ............... | 379/93.23 |
| 5,812,776 | A |   | 9/1998 | Gifford |   |   |
| 5,870,454 | A | * | 2/1999 | Dahlen | .................... | 379/88.14 |
| 5,945,989 | A | * | 8/1999 | Freishtat et al. | ............. | 715/760 |
| 6,058,435 | A | * | 5/2000 | Sassin et al. | ................ | 719/331 |
| 6,100,890 | A |   | 8/2000 | Bates et al. |   |   |
| 6,141,413 | A | * | 10/2000 | Waldner et al. | .......... | 379/88.17 |
| 6,169,897 | B1 |   | 1/2001 | Kariya |   |   |
| 6,192,218 | B1 | * | 2/2001 | Laufmann et al. | .......... | 340/7.53 |
| 6,219,638 | B1 | * | 4/2001 | Padmanabhan et al. | ..... | 704/235 |
| 6,507,643 | B1 | * | 1/2003 | Groner | .................... | 379/88.14 |

(Continued)

FOREIGN PATENT DOCUMENTS

JP 11146083 5/1999

(Continued)

OTHER PUBLICATIONS

"Intel's DOt.Station joins crowsed device market", CNET news. com, http://news.com.com/Intels+Dot. Station+joins+crowded+device+market/2100-1040_3-242264. html.*

*Primary Examiner*—David E England
(74) *Attorney, Agent, or Firm*—Justin Dillon; Jeffrey L. Streets

(57) ABSTRACT

A method for sending a message containing a Uniform Resource Locator (URL) to a customer. The method includes recording in a customer's telephone system a destination address of the communications terminal, selecting at least one URL to be sent to the communications terminal during a telephone call, obtaining the destination address, generating a message containing the URLs, and sending the message from a telephone system of the merchant or sender to the destination address of the customer's communications terminal. The message may also contain additional items, including for example, electronic coupons, an on-line trial subscription, a user ID, a user password, advertisements, sender information, or combinations thereof, wherein the user ID and user password are required by the Website having the address of the URLs. The method may further include recording the at least one URL into the bookmark section of the browser in the communications terminal.

42 Claims, 2 Drawing Sheets

U.S. PATENT DOCUMENTS

| | | | |
|---|---|---|---|
| 6,665,395 B1 * | 12/2003 | Busey et al. | 379/265.09 |
| 6,668,054 B1 * | 12/2003 | Contino et al. | 379/265.09 |
| 6,940,958 B2 * | 9/2005 | Clapper | 379/142.01 |
| 2003/0026403 A1 * | 2/2003 | Clapper | 379/142.06 |

FOREIGN PATENT DOCUMENTS

| | | | |
|---|---|---|---|
| JP | 2000278446 A | 10/2000 | |
| JP | 2001036668 A | 2/2001 | |
| WO | WO9927693 A2 | 6/1999 | |
| WO | WO 00/56049 | 9/2000 | |

\* cited by examiner

AUTOMATICALLY SENDING A URL BY E-MAIL OR TELEPHONE

BACKGROUND OF THE INVENTION

1. Field of the Invention

The present invention relates to telephone systems and, more specifically, to telephone systems and methods for providing business information to consumers.

2. Description of the Related Art

The Internet has become a powerful tool that is used by many people on a daily basis. The Internet, through the World Wide Web, provides people with information on a wide range of subjects including, for example, consumer information, order shipment tracking, business opportunities, and health issues. Most large corporations and many small businesses now have their own Websites for selling their products and for providing product information to customers. These Websites are contacted over the World Wide Web by using a Web browser on the customer's computer. The browser connects with the Website by using the Uniform Resource Locator (URL), the global address of documents and other resources located on the World Wide Web. The URL may be typed into the browser manually each time the user wishes to contact the Website or the URL may be stored in the browser's bookmark section. If the URL is stored in the browser's bookmark section, a simple click of the mouse on the bookmark will instruct the browser to connect with the Website of the selected URL.

Often, a customer speaking to a business representative on the telephone will ask for that business's URL so that the customer can later check the Website for information concerning, for example, the status of the customer's order, warranty information, or product specifications. The business representative may then accurately recite the URL over the telephone, the customer must accurately write the URL down, and the customer must accurately enter the URL into the browser of the customer's computer in order to successfully gain access to the desired information. The URL can often be quite long and quite complex, made up of symbols, numbers and letters.

Therefore, there is a need for a method to record a URL into the browser without missing any of the symbols, letters or punctuation that must appear in an exact manner for the browser to connect with the desired Website. It would be an advantage if the method could be implemented during a telephone call placed by a customer to a merchant or other type of owner of the desired website. It would be very advantageous if the URL transfer could be totally automatic without requiring the URL to be typed into the browser.

SUMMARY OF THE INVENTION

The present invention provides a method for a telephone system to send an electronic message containing a Uniform Resource Locator (URL) to a customer's address. The method includes receiving a telephone call having a customer identification record including a destination address, selecting one or more URL's to be sent to the destination address, generating and sending an electronic message containing the one or more selected URL's, to the destination address. Preferably, the URL is selected to be responsive to an inquiry made during the telephone call. The electronic message may contain additional items other than the selected URL's, including, for example, electronic coupons, an on-line trial subscription, user ID's, user passwords, advertisements, sender information, or combinations thereof, wherein the user ID's and user passwords are required by the Websites having the addresses of the URL's. The method may further include recording the one or more URL's into the bookmark section of the communications terminal's browser.

Both the customer's telephone system and the sender's telephone system may be independently selected from a digital telephone, a centrex, a PBX, a telephone service provider or combinations thereof. The communications terminal, to which the electronic message is sent, may be selected from a mobile telephone, a personal computer, a handheld computer, a personal digital assistant or combinations thereof, or it may be any device capable of receiving e-mail. The destination address for the electronic message may be an Internet address, a computer network address, a specific e-mail address or a telephone number.

The destination address is recorded into the customer's telephone system by selecting a menu function on the customer's telephone system suitable for recording the destination address. The address is then stored in association with the customer's telephone as part of the customer's caller ID service. The step of obtaining the destination address is selected from capturing or reading the destination address from the caller ID received during a telephone session with the customer, querying the customer to transmit the destination address to the sender's telephone system, or combinations thereof. It is necessary to query the customer for the destination address if merchant initiates the call (the customer is not the caller and thus no caller ID is received) or if the customer initiates the call but the caller ID does not include a destination address.

In one embodiment the step of selecting the one or more URL's further comprises requesting the sender's telephone system to provide a menu of the one or more URL's. The menu may then provide a code for each of the one or more URL's and then allowing the customer to choose the one or more URL's to capture, wherein choosing is accomplished by entering the code, for example using a keypad on the customer's telephone or using voice recognition, for each of the one or more URL's selected.

The present invention may optionally provide for registering the destination address with a database maintained by a third party service provider that serves as an interface between the customer and various merchants. In this embodiment, the customer provides the merchant with identification of the service provider. The merchant then provides the relevant information to the service provider for forwarding to the attention of the customer.

It is an important aspect of the present invention, for the URL information to be transmitted from the merchant to the customer regardless of whether it was the customer or the merchant who initiated the telephone call. The customer's identification information and the merchant's URL information may each be provided either verbally, by electronic transmission on command, or through a third party service provider. In the instance where the customer initiates the call, it is preferred that customer's identification or contact information be provided along with its caller ID signal. However, it is possible for the customer to provide the merchant with the customer's identification information or that of the customer's third party service provider. Conversely, in the instance where the merchant initiates the call, the merchant will not typically receive any type of automatic customer identification information. Therefore, if the customer decides to provide the merchant with such identification information, presumably to allow the merchant to send its URL information to the customer, the customer must do so verbally or by commanding its telephone to transmit identification information stored in the telephone.

The foregoing and other objects, features and advantages of the invention will be apparent from the following more particular description of a preferred embodiment of the inventions, as illustrated in the accompanying drawings wherein like reference numbers represent like parts of the invention.

DETAILED DESCRIPTION OF THE INVENTION

Figure 1:
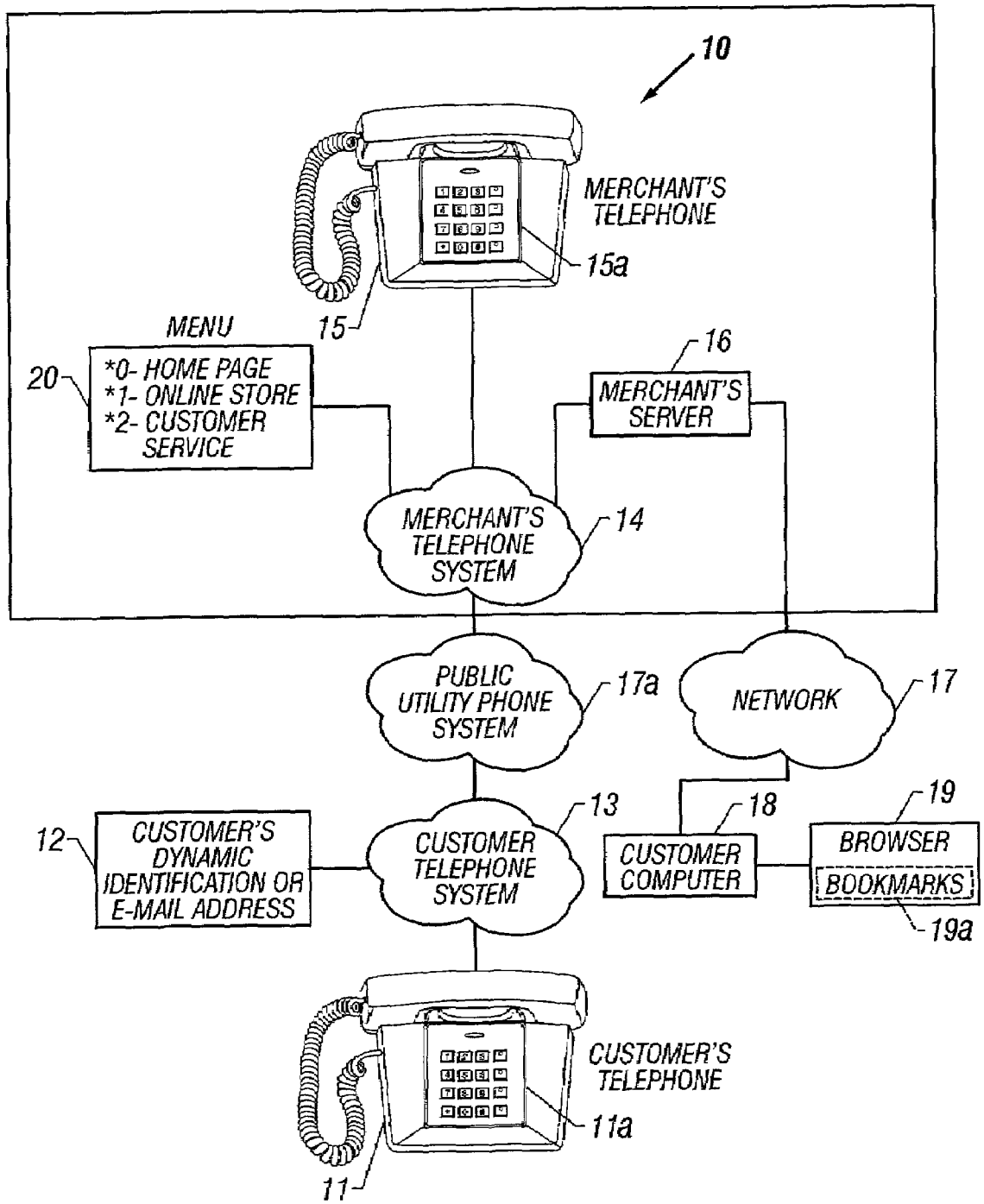
FIG. 1 is a schematic diagram showing the system of the present invention.

The present invention provides a method for automatically sending a Uniform Resource Locator (URL) during a telephone call, whereby the URL is transmitted electronically to a customer at a destination address provided by the customer. While it is preferred that the customer's telephone system automatically transmit the destination address to a merchant, the present invention includes any dynamic transmission of the customer's destination address to the merchant.

The present invention provides a method for sending a URL to a customer's communications terminal from a merchant's telephone system. When a customer places a telephone call to another entity, such as, for example, a merchant or business enterprise, the customer may want to receive the URL for the business's home page or customer service Website. Instead of writing the URL down or attempting to memorize it until the customer has time to record the URL in the customer's browser, and then recording the URL in the browser's bookmark section by manually entering the URL by using keystrokes, the present invention provides a method for sending the URL to the customer's communications terminal. The method includes recording in the user's telephone system a destination address for a communication terminal to receive the URL, selecting one or more URL's preferably from a menu that may be played over the telephone, and then sending an electronic message from the merchant's telephone system to the communications terminal for recording the URL for later use.

The communications terminal could be any device that can store and retrieve e-mail and is connectable to a telephone network, a device that can store and retrieve e-mail and is connectable to a computer network, or combinations thereof. Examples may be a mobile telephone, a personal computer, a handheld computer, a personal digital assistant, or combinations thereof. The destination address for the communications terminal could be, for example, a telephone number, an Internet address, or a computer network address.

It is an important aspect of the present invention, for the URL information to be transmitted from the merchant to the customer regardless of whether it was the customer or the merchant who initiated the telephone call. Preferably, the customer records the destination address for the communications terminal in the caller ID service of the customer's telephone system so that the merchant's (or other URL-provider's) telephone system may read the address. Alternatively, the customer may register the customer's destination address with the customer's telephone service provider so that the telephone service provider may attach the destination address to the customer's caller ID. Optionally, the customer may record the customer's destination address in the customer's telephone system, but not as part of the customer's caller ID. Then, when the merchant requests that the customer provide a destination address, the customer may choose to transmit the destination address stored in the customer's telephone system to the merchant. Alternatively, the customer may register the customer's destination address with the merchant for storage in a database of the merchant. Then, when the customer places a telephone call to the merchant, the merchant may retrieve the destination address from the database based upon the name contained in the customer's caller ID, or based up the name given by the customer during the telephone conversation, or other suitable means and then dispatch a message containing the desired URL's to the destination address.

After the merchant's telephone system has received the customer's destination address, either by reading the customer's caller ID or by any other option discussed above, the merchant's telephone system generates and sends a message addressed to the customer's destination address and provides a URL with the message. Alternatively, the telephone system may provide a server, or other computer or suitable device, with the destination address and allow the server to generate and send the message containing the URL, such as an e-mail message sent to the customer's e-mail address. Optionally, the merchant could provide a group of URL's for sending in a single message. As another option, the merchant's telephone system could play a menu of available URL's and allow the customer to use the customer's keypad to select the URLs from a menu or URLs that the customer wants to receive. For example, the menu could provide: by pressing 1, a URL to the merchant's home page; by pressing 2, a URL to the merchant's order tracking page; by pressing 3, a URL to a product ordering page; and so forth. The selection process may also allow the customer to select more than one URL by, for example, pressing 9 to indicate a desire to select an additional URL or pressing 0 to indicate that the customer does not desire to select additional URL's. Optionally, additional items may be attached to the message including, for example, electronic coupons, a user ID and password that might be required for accessing areas within a Website for the URL, advertisements, trial subscriptions, merchant information and the like. In one embodiment, the customer may request a URL, possibly by selecting from a menu, while the customer's call is on hold.

The form of the destination address to which the message is to be sent will notify the merchant's telephone system whether to send the message over the Internet or over the telephone network. For example, if the destination address is a telephone number, the merchant's telephone system will know to send the message over the telephone network to the customer's digital telephone capable of receiving such messages. If the address is an Internet address, the merchant's telephone system will know to send the message over the Internet, such as an e-mail message.

It will be appreciated from the description above that the present invention may be implemented in software that is stored as executable instructions on a computer readable medium on the customer's telephone system, the merchant's telephone system, the merchant's server and the customer's computer or other communications terminal. These instructions would include, for example, an operating system program, application programs, and a browser program. The merchant's telephone system is thus suitable for: (1) reading the destination address from the customer's caller ID, (2) presenting a menu of URL's for selection of URL's to be sent in a message, and (3) instructing a server, or other suitable device, to generate a message, addressed to the destination address of the customer, containing the selected URL's.

FIG. 1 is a schematic diagram showing a system 10 of the present invention. A customer places a telephone call from the customer's telephone 11 through the customer's telephone system 13 through the public utility telephone system 17a through the merchant's (or other sender's) telephone system 14 and to the merchant's telephone 15. The customer's telephone system 13 and the merchant's telephone system 14 may each be either a digital telephone, a centrex system, a PBX system, a telephone service provider or combinations thereof. A telephone service provider is a public or private utility providing telephone service to its customers, usually including a selection of optional services such as call waiting, messaging service, caller ID, and the like. A PBX system, an acronym for private branch exchange, is a private telephone system network used within an enterprise whereby users of the PBX share a certain number of outside lines for making calls external to the PBX. A centrex system, an acronym for central office exchange, is a type of PBX in which switching occurs at a local telephone station instead of at the enterprise's premises.

When the customer telephones the merchant, the customer's telephone system attaches the customer's caller ID record 12 to the outgoing call. The caller ID record 12 provides information to the merchant's telephone system including, for example, the telephone number, date and time of the telephone call, and the name and destination address of the customer. Typically, this customer information is displayed to the other party when the other party has a device, not shown, capable of displaying this information. The caller ID record 12 is programmed into the customer's telephone system so that whenever the customer places a telephone call, the record is attached to the outgoing telephone call. Optionally, the customer may block attaching the caller ID record 12 to the outgoing telephone call by keying in a predetermined code before the customer places the telephone call. Likewise, the customer may optionally choose only to block the destination address portion of the caller ID record attached to the outgoing telephone call, thereby allowing the caller ID record to still provide the number and name of the customer but not the destination address. Additionally, the system could be set up to prevent attachment of any caller ID information, or just some limited information of choice, unless the customer keys in a predetermined code prior to placing the call.

After the telephone call is established, the merchant's telephone system 14 reads the destination address from the caller ID 12 and instructs the server 16 to send an electronic message to the device at the destination address provided in the caller ID. Alternatively, the customer could select the URL's that the customer would like to receive from a menu 20 provided by the merchant. Furthermore, as another alternative, the merchant could select, from the menu 20, more than one URL to be sent to the customer. The server 16 then generates an electronic message and dispatches the message through the Internet 17, or other computer or telephone network, to the customer's device, such as computer 18. Alternatively, the server could be a personal computer, a processor that is part of the merchant's telephone system, or any device that can receive the instruction to send the message, generate the message, address and send the message over the Internet or a telephone system to the customer's communication terminal. Furthermore, the customer's communication terminal 18 could be a digital telephone, a handheld computer, a personal digital assistant or any device that can receive electronic messages from the Internet or from a telephone system.

In a preferred embodiment, the electronic message is an e-mail message sent to a computer. After the e-mail is sent to the customer's computer, the customer opens the e-mail and saves the URL to the browser 19 running on the customer's computer. Preferably, the URL is saved to the bookmark section 19a of the browser 19. Then, a simple click of the mouse on the bookmarked URL will instruct the browser to connect to the address contained in the URL.

Figure 2:
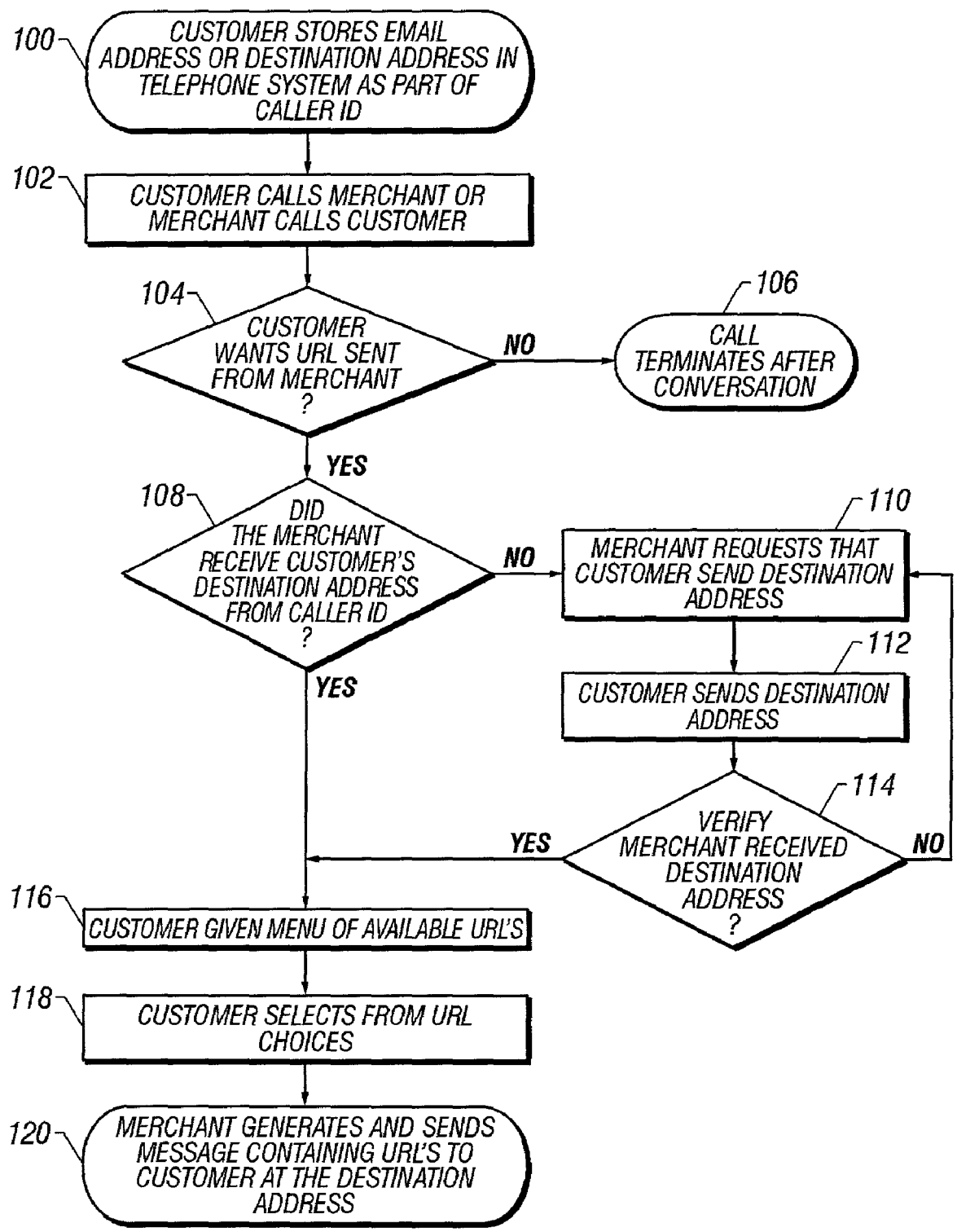
FIG. 2 is a flow chart of a method for receiving a URL during a telephone call.

FIG. 2 is a flowchart of a method that may be executed on the system of FIG. 1. In state 100, the customer stores the customer's destination address in the customer's telephone system, preferably so that the destination address will be part of the customer's caller ID record. This may be done by the person responsible for maintaining the customer's telephone system or by the customer's telephone service provider. In state 102, a telephone connection is established, whether by the customer placing a telephone call to the merchant or by the merchant placing a telephone call to the customer. In state 104, it is determined whether the customer wants the merchant to send a message with a URL. If the customer indicates to the merchant that the customer does not want to receive a message containing a URL, then in state 106, the telephone call terminates after the conversation is completed. If the customer does want to receive a message containing a URL, then in state 108, it is determined whether the merchant received the customer's destination address from the customer's caller ID. This may be the case if the customer initiated the call.

If the merchant did not receive the customer's destination address from caller ID, such as when the merchant initiates the call, then, in state 110, the merchant requests that the customer send a destination address to the merchant. In state 112, the customer sends or provides the destination address to the merchant, preferably by a manually initiated electronic transmission from the customer's telephone system. If, in state 114, the merchant cannot verify that it has received the customer's destination address, then the process returns to step 110. However, if, in state 114, the merchant verifies receipt of the customer's destination address, then the merchant provides the customer with a menu of URL's, in state 116, that may be selected by the customer by using the keypad on the customer's telephone. The customer selects one or more URLs from the menu in state 118. Finally, in state 120, the merchant's telephone system generates and sends a message containing the selected URL's to the customer at the destination address provided by the customer.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer implemented method for providing a Uniform Resource Locator (URL) to a customer, comprising:

receiving a customer identification record including a destination address associated with a communications terminal of the customer during a telephone call with the customer;

selecting at least one URL to be sent to the destination address of the customer; and generating and sending an electronic message containing the at least one URL to the destination address of the customer, wherein the step of sending an electronic message further comprises detecting the first party identification and dispatching the e-mail to the destination address registered in the sender database under the first party identification, wherein the first party identification is detected by a technique selected from reading the first party identification from the caller ID, querying the first party for the first party identification, or combinations thereof.

2. The method of claim 1, wherein the electronic message contains additional items selected from an electronic coupon, an on-line trial subscription, a user ID, a user password, advertisements, merchant information, or combinations thereof, wherein the user ID and user password are required by the Website having the address of the URL.

3. The method of claim 1, further comprising:
recording the at least one URL into a bookmark section of a browser in the communications terminal.

4. The method of claim 1, wherein the customer has a telephone system selected from a digital telephone, a centrex, a PBX, a telephone service provider or combinations thereof.

5. The method of claim 1, wherein a merchant sending the electronic message has a telephone system selected from a digital telephone, a centrex, a PBX, a telephone service provider or combinations thereof.

6. The method of claim 1, wherein the communications terminal is selected from a mobile telephone, a personal computer, a handheld computer, a personal digital assistant or combinations thereof.

7. The method of claim 1, wherein the communications terminal is a device capable of receiving e-mail.

8. The method of claim 1, wherein each URL comprises an address for connecting to a Website.

9. The method of claim 1, wherein the step of recording the destination address comprises:
selecting a menu function on a telephone system of the customer for recording the destination address associated with the communications terminal; and
specifying the destination address on an interactive display provided by the telephone system of the customer.

10. The method of claim 9, further comprising:
saving the destination address as part of a caller ID within the telephone system.

11. The method of claim 10, wherein the caller ID contains information selected from date, time, customer telephone number, customer name, customer e-mail address or combinations thereof.

12. The method of claim 1, wherein the step of selecting the at least one URL further comprises:
requesting the telephone system of the merchant to provide a menu of URLs, wherein the menu provides a code associated with each of the URLs; and
choosing the at least one URL to capture by entering the associated code, using a keypad on the customer's telephone, for each of the selected URLs.

13. The method of claim 1, wherein the step of receiving the destination address is selected from reading the address from a caller ID, querying the customer to transmit the address to the telephone system of the merchant, or combinations thereof.

14. The method of claim 1, wherein the destination address for the communications terminal is selected from a computer network address, an Internet address or a telephone number.

15. A method for sending a Uniform Resource Locator (URL) to a communications terminal of a first party, the method performed on a computer, comprising:
registering a destination address of the communications terminal with a database maintained by a sender;
selecting at least one URL to be sent to the communications terminal during a telephone call between the first party and the sender;
generating an e-mail by a telephone system of the sender containing the at least one URL; and sending the e-mail containing the at least one URL from a telephone system of the sender to the destination address of the communications terminal, wherein the step of sending an e-mail further comprises detecting the first party identification and dispatching the e-mail to the destination address registered in the sender database under the first party identification, wherein the first party identification is detected by a technique selected from reading the first party identification from the caller ID, querying the first party for the first party identification, or combinations thereof.

16. A computer program product including instructions stored on a computer readable medium, for sending a Uniform Resource Locator (URL) to a communications terminal of a first party, the instructions comprising:
receiving instructions for receiving a first party identification record including a destination address of the communications terminal during a telephone call with the first party;
selecting instructions for selecting at least one URL to be sent to the destination address of the communications terminal;
generating instructions for generating an electronic message containing the at least one URL; and
sending instructions for sending the electronic message containing the at least one URL to the destination address of the communications terminal, wherein the step of sending an electronic message further comprises detecting the first party identification and dispatching the e-mail to the destination address registered in the sender database under the first party identification, wherein the first party identification is detected by a technique selected from reading the first party identification from the caller ID, querying the first party for the first party identification, or combinations thereof.

17. The computer program product of claim 16, wherein the electronic message contains additional items selected from an electronic coupon, an on-line trial subscription, a user ID, a user password, advertisements, sender information, or combinations thereof, wherein the user ID and user password are required by the Website having the address of the URL.

18. The computer program product of claim 16, further comprising:
recording instructions for recording the at least one URL into a bookmark section of a browser on the communications terminal.

19. The computer program product of claim 16, wherein the first party telephone system is selected from a digital telephone, a centrex, a PBX, a telephone service provider or combinations thereof.

20. The computer program product of claim 16, wherein a sender telephone system is selected from a digital telephone, a centrex, a PBX, a telephone service provider or combinations thereof.

21. The computer program product of claim 16, wherein the communications terminal is selected from a mobile telephone, a personal computer, a handheld computer, a personal digital assistant or combinations thereof.

22. The computer program product of claim 16, wherein the communications terminal is a device capable of receiving e-mail.

23. The computer program product of claim 16, wherein each URL comprises an address for connecting to a Website.

24. The computer program product of claim 16, wherein the recording instructions for recording the destination address comprises:
  selecting instructions for selecting a menu function on the telephone system of the customer for recording the destination address of the communications terminal;
  specifying instructions for specifying the destination address on an interactive display provided by the telephone system of the first party.

25. The computer program product of claim 24, further comprising:
  saving instructions for saving the destination address as part of a first party ID within the telephone system of the first party.

26. The computer program product of claim 25, wherein the caller ID contains information selected from date, time, first party telephone number, first party name, first party e-mail address or combinations thereof.

27. The computer program product of claim 16, wherein the selecting instructions for selecting the one or more URL's further comprises:
  requesting instructions for requesting the sender telephone system to provide a menu of URLs, wherein the menu provides a code for each of the URLs;
  choosing instructions for choosing the at least one URL to capture, wherein choosing is accomplished by entering the code, using a keypad on the customer telephone, for each URL selected.

28. The computer program product of claim 16, wherein the destination address for the communications terminal is selected from a computer network address, an Internet address or a telephone number.

29. A computer system for providing a Uniform Resource Locator (URL) to a first party comprising:
  receiving means for receiving a first party identification record including a destination address associated with a communications terminal of the first party during a telephone call with the first party;
  selection means for selecting at least one URL to be sent to the destination address of the first party;
  messaging means for generating and sending an electronic message containing the at least one selected URL to the destination address, wherein the sending an electronic message further comprises detecting the first party identification and dispatching the e-mail to the destination address registered in the sender database under the first party identification, wherein the first party identification is detected by a technique selected from reading the first party identification from the caller ID, querying the first party for the first party identification, or combinations thereof.

30. The computer system of claim 29, wherein the wherein the electronic message contains additional items selected from an electronic coupon, an on-line trial subscription, a user ID, a user password, advertisements, sender information, or combinations thereof, wherein the user ID and user password are required by the Website having the address of the URL.

31. The computer system of claim 29, further comprising:
  recording means for recording the at least one URL into a bookmark section of the communications terminal's browser.

32. The computer system of claim 29, wherein the first party telephone system is selected from a digital telephone, a centrex, a PBX, a telephone service provider or combinations thereof.

33. The computer system of claim 29, wherein a sender telephone system is selected from a digital telephone, a centrex, a PBX, a telephone service provider or combinations thereof.

34. The computer system of claim 29, wherein the communications terminal is selected from a mobile telephone, a personal computer, a handheld computer, a personal digital assistant or combinations thereof.

35. The computer system of claim 29, wherein the communications terminal is a device capable of receiving e-mail.

36. The computer system of claim 29, wherein each URL comprises an address for connecting to a Website.

37. The computer system of claim 29, wherein the recording means further comprises:
  menu means for selecting a menu function on the telephone system of the first party for recording the communications terminal's destination address;
  specifying means for specifying the destination address on an interactive display provided by the customer telephone system.

38. The computer system of claim 37, further comprising:
  storage means for storing the destination address as part of a caller ID within the telephone system of the first party.

39. The computer system of claim 38, wherein the caller ID contains information selected from date, time, first party telephone number, first party name, first party e-mail address or combinations thereof.

40. The computer system of claim 29, wherein the selection means further comprises:
  requesting means for requesting the sender's telephone system to provide a menu of URLs, wherein the menu provides a code for each of the URLs; and
  selecting means for selecting the at least one URL to capture by entering the code, using a keypad on the first party telephone, for each of the at least one URL selected.

41. The computer system of claim 29, wherein the receiving means includes reading means for reading the destination address from a caller ID record.

42. The computer system of claim 29, wherein the destination address for the communications terminal is selected from a computer network address, an Internet address or a telephone number.

* * * * *

UNITED STATES PATENT AND TRADEMARK OFFICE
CERTIFICATE OF CORRECTION

PATENT NO. : 7,593,990 B2
APPLICATION NO. : 10/047004
DATED : September 22, 2009
INVENTOR(S) : Himmel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1975 days.

Signed and Sealed this

Fourteenth Day of December, 2010

David J. Kappos
*Director of the United States Patent and Trademark Office*